United States Patent [19]

Haley

[11] 4,353,457
[45] Oct. 12, 1982

[54] AIRLIFT

[75] Inventor: Ernest K. Haley, Louisville, Ky.

[73] Assignee: Lerco Corporation, Louisville, Ky.

[21] Appl. No.: 194,641

[22] Filed: Oct. 6, 1980

Related U.S. Application Data

[63] Continuation-in-part of Ser. No. 32,833, Apr. 24, 1979, abandoned.

[51] Int. Cl.³ .................. B65G 25/00; B65G 37/00; B65G 19/02
[52] U.S. Cl. .............................. 198/774; 198/488; 198/574; 414/351; 414/495; 414/535
[58] Field of Search ................ 198/488, 574, 774; 414/349, 351, 495, 518, 531, 535, 749

[56] References Cited

U.S. PATENT DOCUMENTS

| | | | |
|---|---|---|---|
| 3,322,259 | 5/1967 | Milazzo | 198/774 X |
| 4,023,672 | 5/1977 | Haley | 198/735 |
| 4,037,738 | 7/1977 | Johnson | 198/774 X |
| 4,042,118 | 8/1977 | Schmidt | 198/774 |
| 4,044,886 | 8/1977 | Sender | 198/488 |
| 4,121,721 | 10/1978 | Hill | 198/774 X |
| 4,187,942 | 2/1980 | Ward | 198/774 X |

Primary Examiner—Jeffrey V. Nase
Attorney, Agent, or Firm—David H. Semmes

[57] ABSTRACT

Transfer table for storage and lateral transport of elongated structural members, such as I-beams, having ¼ inch or greater flanges. The table includes a plurality of longitudinally extending stationary supports defining a lateral carriage for the I-beam flanges. Individual roller carriages are reciprocally supported within at least two adjacent supports, each roller carriage having a plurality of longitudinally extending trains of idler rollers, staggered upon transverse axes atop the carriage. Each roller carriage includes an expansible mid-section, so as to lift the idler rollers and the I-beams supported thereon above the level of the longitudinally extending stationary supports. A conveyor drive attached to each roller carriage then propels the roller carriage and I-beams supported thereon across the transfer table to an axial conveyance.

7 Claims, 10 Drawing Figures

4,353,457

AIRLIFT

This is a continuation of application Ser. No. 032,833, filed Apr. 24, 1979 now abandoned.

CROSS-REFERENCES TO RELATED APPLICATIONS

An improvement upon applicant's Transfer Table, as disclosed in U.S. Pat. No. 4,023,672.

In the present disclosure the longitudinally extending trains of idler rollers are replaced by individual roller carriages within each longitudinal support.

SUMMARY OF THE INVENTION

According to the present invention, the I-beam transfer table is provided with a plurality of longitudinally extending supports, each support having a roller top carriage reciprocably mounted upon a wheeled chassis which moves within the longitudinally extending support. The roller top carriage includes a roller top, of four roller trains, mounted upon staggered axes of the type defined in U.S. Pat. No. 4,023,672, and including a vertically extensible mid-section and a wheeled chassis. As it is desired to move an I-beam, the roller carriages are conveyed to a position beneath the I-beam, then the mid-section is expanded, such that the roller trains engage the I-beam flanges. The roller carriages may then be moved to laterally transfer the I-beam across the transfer table and into an axial conveyor for further modification or conveyance of the I-beam.

DESCRIPTION OF THE PREFERRED EMBODIMENTS

Figure 1:
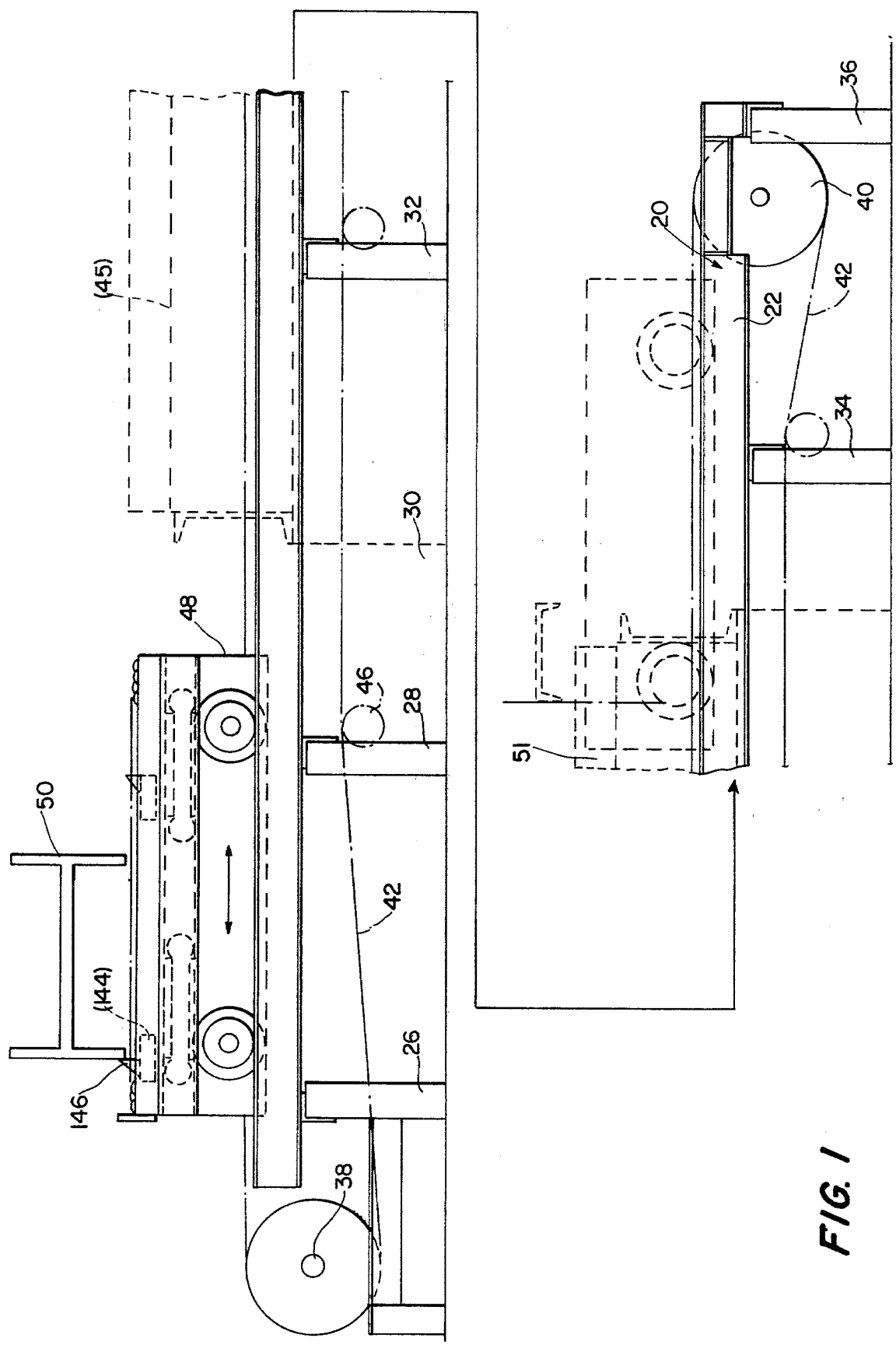
FIG. 1 is a front elevation of a single longitudinally extending support, showing the roller top carriage supporting an I-beam within the transfer area. The datum line marking the lateral extremity of the axial conveyance, is indicated in phantom at the right side. This datum line defines the area of work or axial conveyance of the I-beam.
Figure 3:
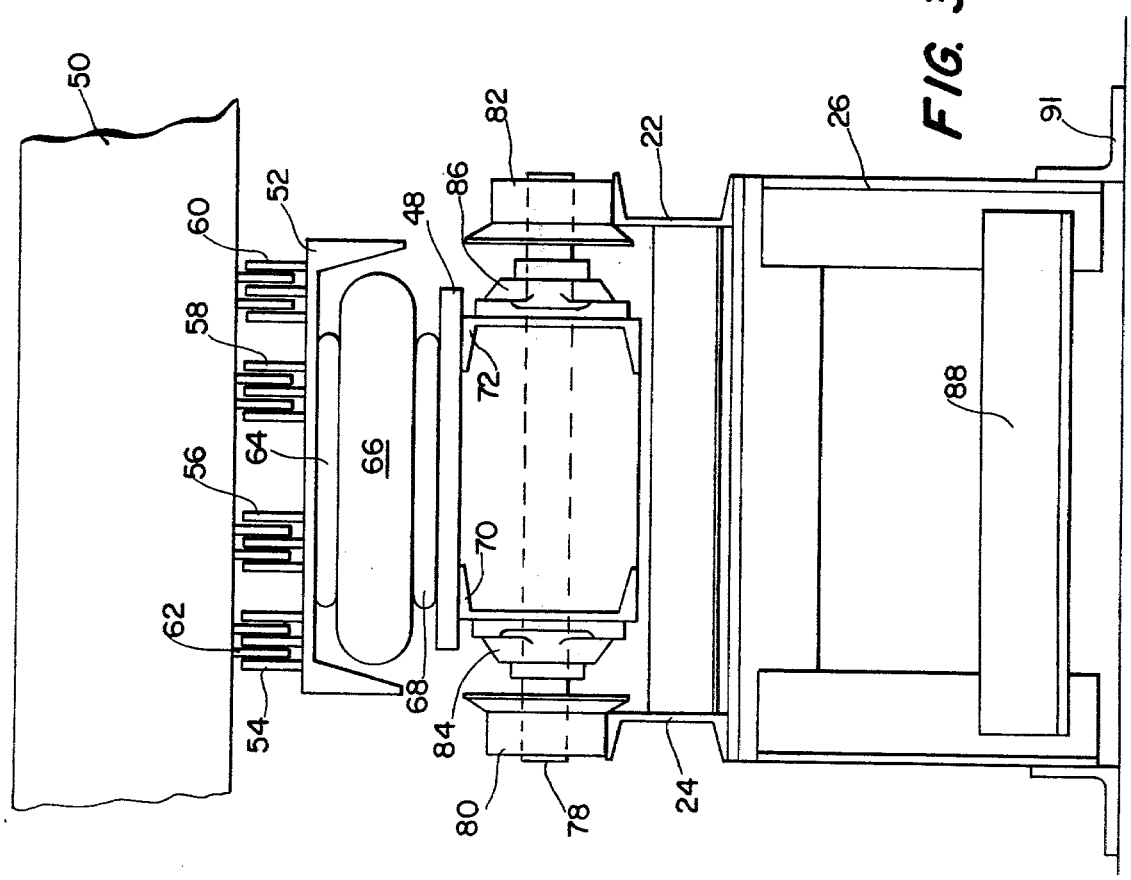
FIG. 3 is an end elevation of the roller top carriage, showing the chassis wheels engaging concave tracks defined within each longitudinally extending support, while an I-beam shown in phantom, is supported transversely upon the rollers.
Figure 5:
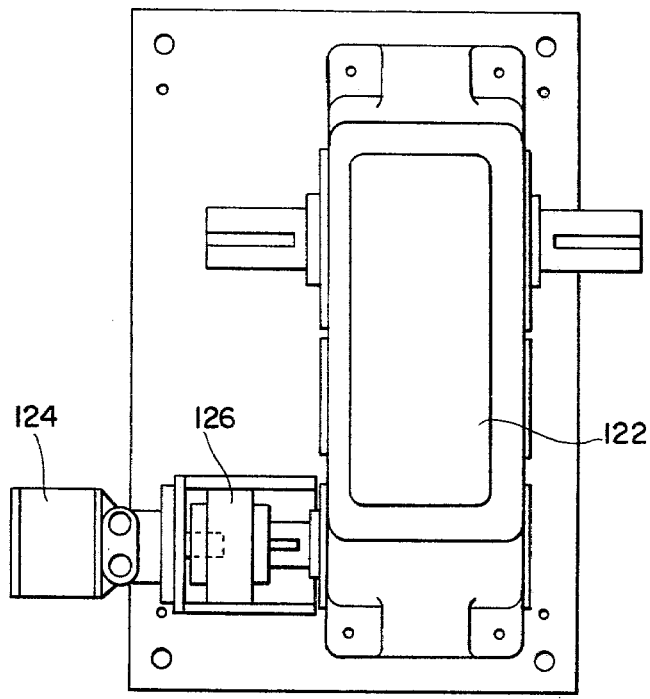
FIG. 5 is an enlarged top plan of the hydraulic motor reducer and coupling mechanism for the roller top carriage, chain drive conveyor.
Figure 6:
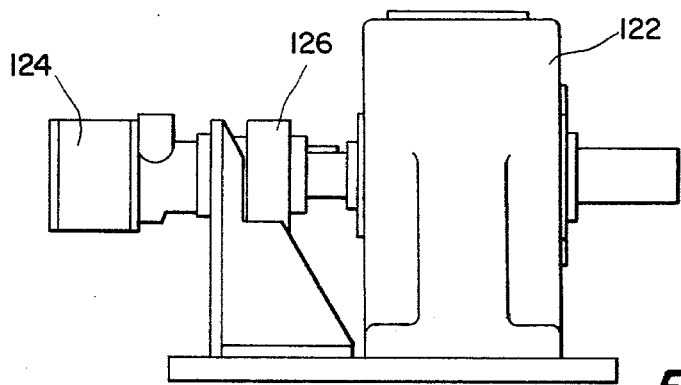
FIG. 6 is an end elevation thereof.

In FIG. 1 transfer table 20 is illustrated as comprised of a plurality of longitudinally extending supports 20 mounted upon vertical stanchions 26, 28, 30, 32, 34 and 36, each having ground engaging bracket 91, as further illustrated in FIG. 3.

Figure 7:
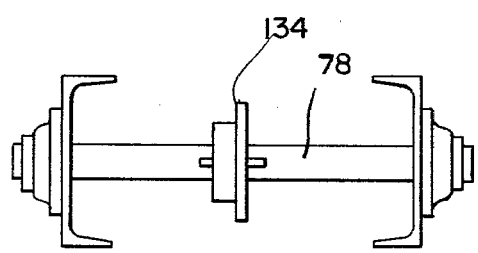
FIG. 7 is an enlarged elevation of the chain drive sprocket for each wheeled chassis.

The roller top carriage assembly is generally designated 48 and includes a wheeled chassis, movable upon concave tracks from the left hand position illustrated in FIG. 1 to the datum line of an axial conveyance, illustrated in phantom on the right hand side. The datum line defines the lateral extremity of a conventional driven roller axial conveyance 45. A suitable chain drive 42 for each roller top carriage may be mounted upon sprockets 38 and 40 and tensioned by idler gears 46, so as to engage the wheeled chassis central sprocket 134 mounted upon axle 78, as illustrated in FIGS. 3 and 7.

Figure 2:
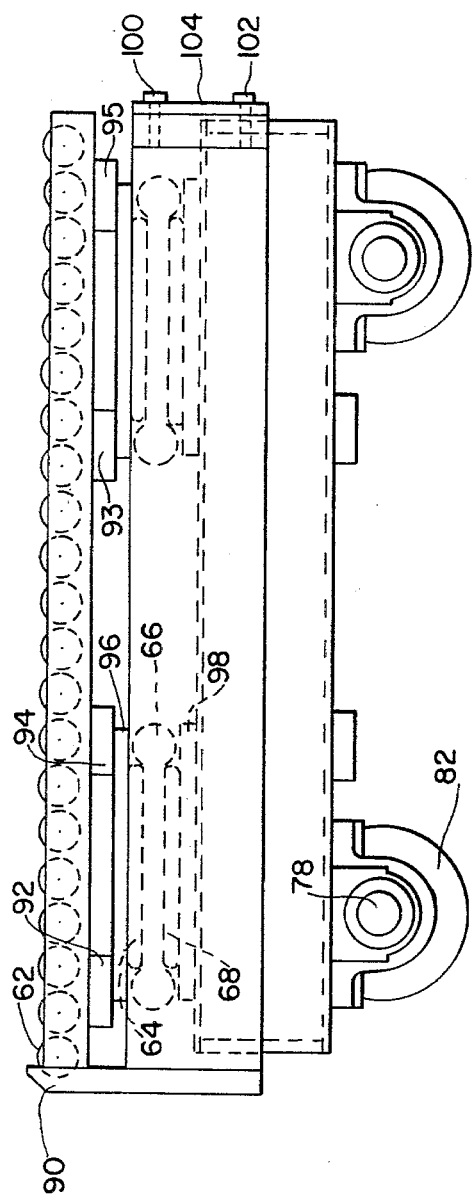
FIG. 2 is an enlarged elevation of the roller top carriage, showing the wheeled chassis, the inflatable mid-section and the roller train top.

Roller carriage 48 is further illustrated in FIGS. 2 and 3 as including a pair of channels 70, 72, defining a housing and supporting a pair of transverse axles 78 upon which wheels 80, 82 are mounted as well as hubs 84 and 86. The individual pairs of wheels 80, 82 may engage longitudinally extending tracks 22 and 24 mounted upon the vertical stanchions 26–36, secured laterally by means of braces 88. A modified support for tracks 22 and 24 is illustrated in FIG. 10.

The wheeled roller carriage 48 includes at its mid-section an inflatable bladder 66 secured between plates 68 and 64. The roller top is supported upon inverted channel 52 and includes four roller trains 54, 56, 58, 60 having identical rollers 62 mounted upon axes staggered longitudinally from each other at ¼ inch, so as to support at all times the ¼ inch or greater flanges of I-beam 50 (shown in phantom). As illustrated in FIG. 2, the roller top carriage may include transverse members 92, 93, 94 and 95 as well as vertical end members 90 and 104, secured by stove bolts 100, 102 or the like.

Figure 10:
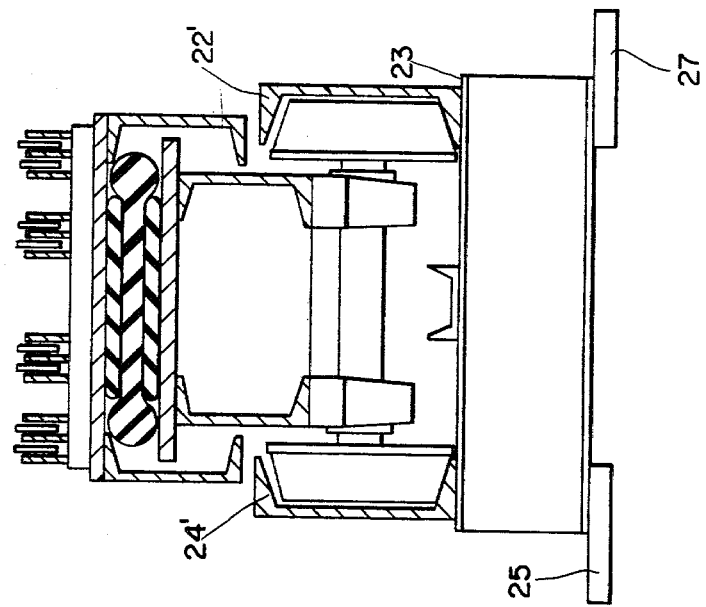
FIG. 10 is a vertical section of a simplified system, showing the roller top carriage, comprised of four longitudinally extending roller trains, a vertically expansible mid-section and a wheeled chassis.

A simplified roller conveyor carriage is illustrated in FIG. 10 wherein the concave tracks are supported upon a plurality of transversely extending channels 23 having conventional base elements 25 and 27.

Figure 4:
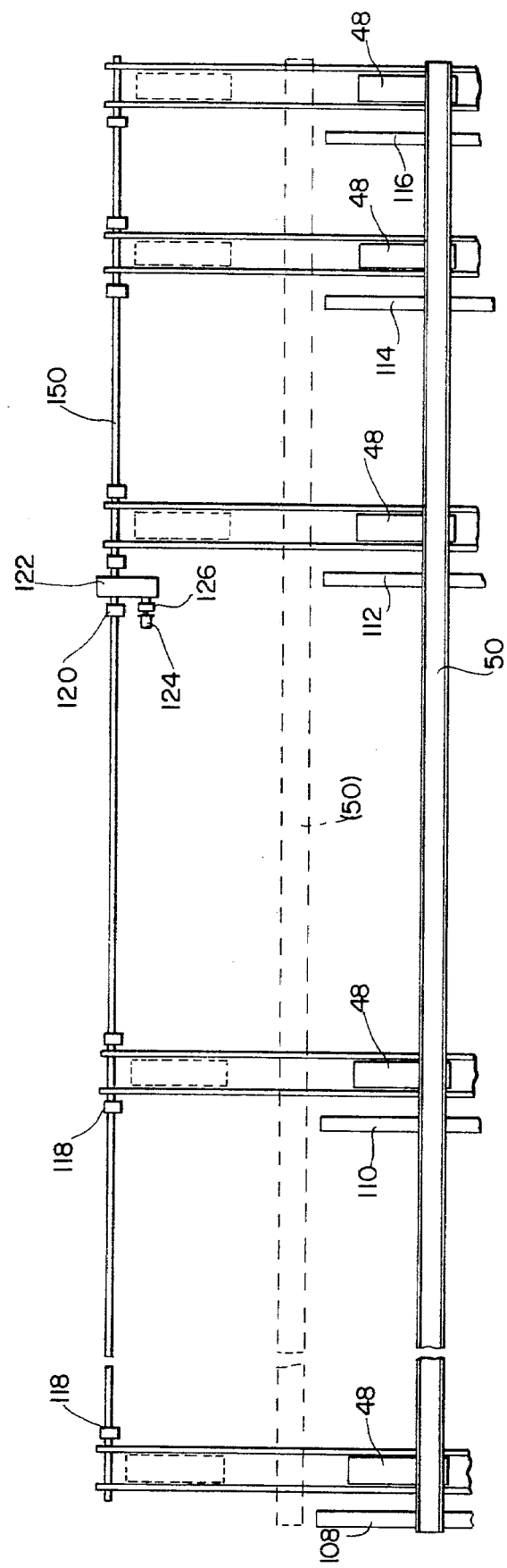
FIG. 4 is a top plan of an air lift conveyor drive mechanism for the roller wheel chassis.

In FIG. 4 the "airlift" or expansible mid-section drive arrangement is shown in top plan, and I-beam 50 is shown (phantom line askew) with respect to the datum line. The individual roller top carriages 48 are shown in position intermediate the longitudinally extending supports 108, 110, 112, 114 and 116.

The individual roller top carriage drive mechanism consists of drive shaft 150, driven by Ross hydraulic motor 124 through reducer 122, chain coupling 126 and conventional Dodge coupling 118.

Figure 8:
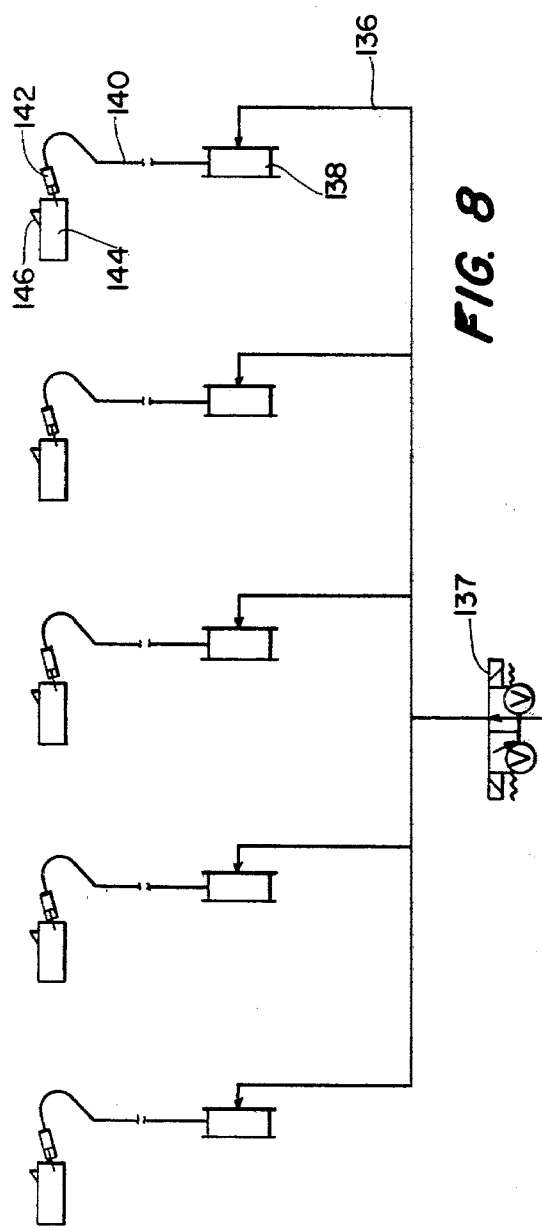
FIG. 8 is a schematic view of a pusher dog pneumatic piping system wherein the individual I-beam engaging lugs may be pivoted in each roller top during lateral transfer or conveyance of I-beams.

In FIG. 8 the pivotable lug or pusher dog 146 pneumatic piping system is illustrated, as consisting of electrically activated valve switches 137, main hydraulic line 136, mounted in reel 138, and individual ¼ inch hydraulic lines 140 extending to pneumatic cylinders 142 supported in housing 144. Lug 146 is pivoted, of course, upon pneumatic activation of air cylinder 142.

Figure 9:
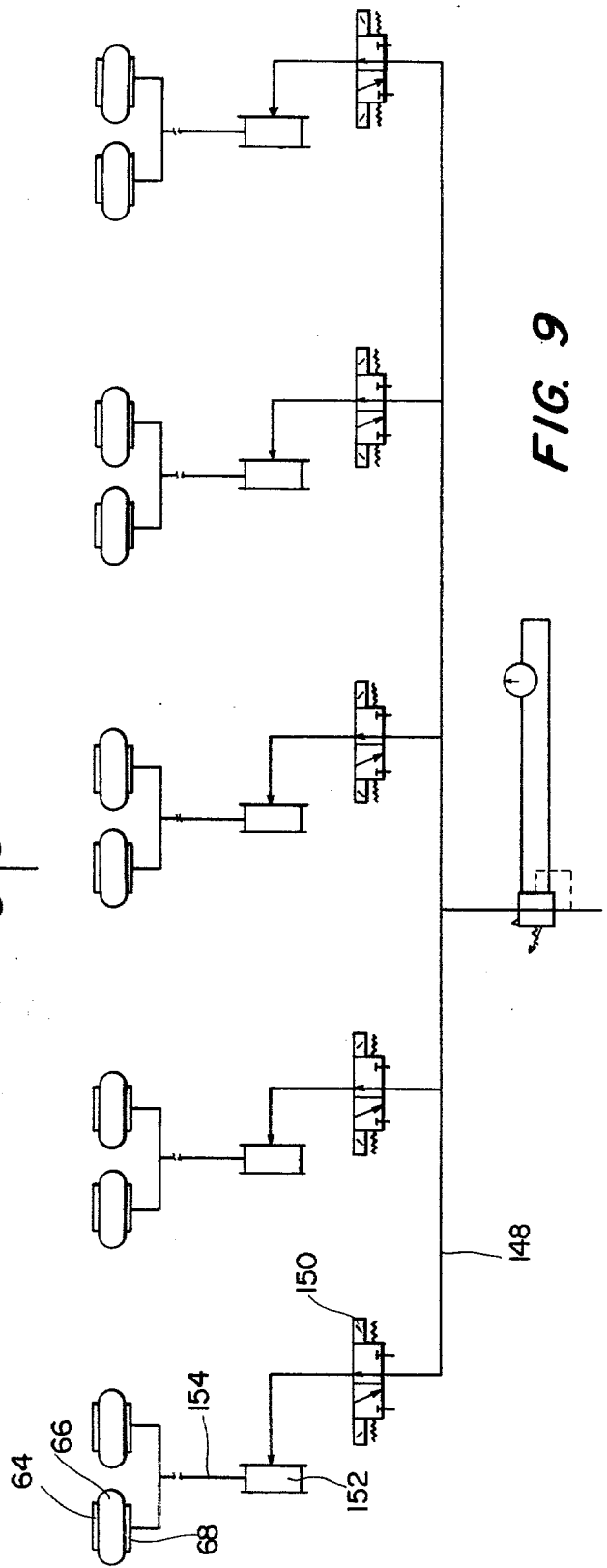
FIG. 9 is a schematic view of a pneumatic piping system for the expansible mid-section in each roller top carriage.

In FIG. 9 the airlift pneumatic piping is illustrated as consisting of main pneumatic line 148, individual valves 150, reels 152 and feeder lines 154, extending to the twin expansible mid-sections 66.

According to the present invention, heavy structural channel rails or I-beams may be handled by a hydraulic power torque motor (10.8 to 1) ratio at a transfer speed of 20 feet per minute.

The airlift table is designed to transfer laterally the I-beams from storage to the active fabrication conveyor line defined by the datum line. Thus, the I-beam is transferred from 90 degrees to the conveyor line travel. I-beams loads 60 feet long, weighing 45,000 pounds can be handled easily and quietly.

The I-beams are loaded upon the storage tables, as defined by the longitudinally extending members, which support the I-beams at 28 inches elevation above the floor. The roller top carriages in collapsed or deflated mode are 27 inches above the floor. To transfer an I-beam to the fabrication line, the roller top carriages must be moved under each beam. Air pressure is applied to the inflatable mid-section in each carriage such that the roller top is raised one inch above the storage table with the individual rollers engaging the I-beam flanges. The roller carriages are then moved by the chain drive mechanism to the datum line. Thence, the roller carriage is lowered, such that the I-beam flanges engage the conventional conveyor rollers 51. If an I-beam is placed upon the storage table askew, the staggered roller train tops of each carriage enables the individual I-beam to be pushed manually back against the conveyor datum line.

I claim:

1. A roller carriage and I-beam transfer table operable for storage and lateral transfer of I-beams and the like onto an axial conveyance which has a line of travel 90° to the transfer table, including the combination of:
   A. A table having:
      (i) a plurality of pairs of longitudinally extending I-beam stationary supports, and
      (ii) a pair of roller carriage tracks supported between each pair of I-beam supports; and
   B. A roller carriage reciprocably supported upon said roller carriage tracks intermediate ech pair of I-beam supports and further including:
      (i) a wheeled base including two pairs of wheels engaging said roller carriage tracks and mounted upon transverse axes;
      (ii) a vertically expansible mid-section including an inflatable bladder; and
      (iii) a roller top supported upon said expansible mid-section and having a plurality of roller trains mounted upon axes parallel to the axes of said pairs of wheels adapted to engage an I-beam flange, each said train extending in a longitudinal direction and each roller train further comprising a first roller mounted upon a first transverse axis and a second roller mounted upon a second transverse axis which is transversely and longitudinally spaced from said first transverse axis wherein each roller train is positioned, so that the first and second transverse axes of each roller train are staggered with respect to the corresponding first and second transverse axis of adjacent roller trains, whereby a plurality of rollers per linear inch are provided in said longitudinal direction upon said supports;
      (iv) a conveyor drive means extending longitudinally between each pair of longitudinal I-beam supports, said conveyor drive means being rotatably mounted fore and aft with respect to said roller trains, such that said conveyor drive means extends longitudinally intermediate said roller carriage tracks; and
      (v) a dog supported upon said conveyor drive means operable to engage the transversely and vertically extending flanges on an I-beam and the like in order to laterally transport said I-beam upon said roller trains at a right angle, with respect to said transverse axes, and longitudinally, with respect to said longitudinal extending supports; and
   C. Means expanding said expansible mid-section, so as to raise said roller tops above said longitudinally extending supports, and an I-beam supported thereon, for lateral transfer of the I-beam from said transfer table to an adjacent conveyance line.

2. A transfer table as in claim 1, said dog being in the form of a pivotal lug, engagable with an I-beam flange during lateral transfer upon said roller carriage.

3. A transfer table as in claim 2, said means expanding said mid-section being in the form of a pneumatically actuated diaphragm.

4. A transfer table as in claim 3, wherein each said longitudinally extending I-beam support and aligned roller train are presented at right angles to an I-beam supported thereon.

5. A transfer table as in claim 4, wherein said conveyor drive means is the sprocket and chain-type.

6. A transfer table as in claim 1, said roller carriage tracks being in the form of a pair of concave tracks, engagable with the wheeled base of said roller carriage.

7. A transfer table as in claim 1, wherein said roller trains are staggered on ¼ inch centers whereby four rollers per lineal inch are provided to accomodate I-beams having ¼ inch flanges.

* * * * *